United States Patent [19]
Mroz

[11] 3,721,399
[45] March 20, 1973

[54] BACKLASH-PROOF FISHING REEL

[76] Inventor: Walter Mroz, 8841 Winston Rd., Anaheim, Calif. 92804

[22] Filed: Jan. 19, 1971

[21] Appl. No.: 107,620

[52] U.S. Cl. .....................242/84.51 R, 242/84.52 R
[51] Int. Cl. ..............................................A01k 89/02
[58] Field of Search.....242/84.51 R, 84.5 R, 84.52 R

[56] References Cited

UNITED STATES PATENTS

| | | | |
|---|---|---|---|
| 1,673,382 | 6/1928 | Hofe | 242/84.5 R |
| 2,012,251 | 8/1935 | Smith | 242/84.52 R |
| 2,279,434 | 4/1942 | Balz | 242/84.5 R |
| 2,285,493 | 6/1942 | Clickner | 242/84.5 R |
| 2,629,565 | 2/1953 | Schafer | 242/84.52 R |
| 2,176,247 | 10/1939 | Coxe | 242/84.51 R |

Primary Examiner—Billy S. Taylor
Attorney—Philip M. Hinderstein

[57] ABSTRACT

In a fishing reel of the type comprising a housing having spaced, parallel front and back plates, and a spool having a shaft connected between first and second spaced, parallel end plates, the spool being supported for rotation within the housing, the improvement wherein a spring, consisting of a plurality of coils of wire, each successive coil having a smaller diameter than the preceding coil, is positioned between the back plate of the housing and the adjacent end plate of the spool, the spring applying a force to the spool to prevent unlimited rotation thereof.

4 Claims, 2 Drawing Figures

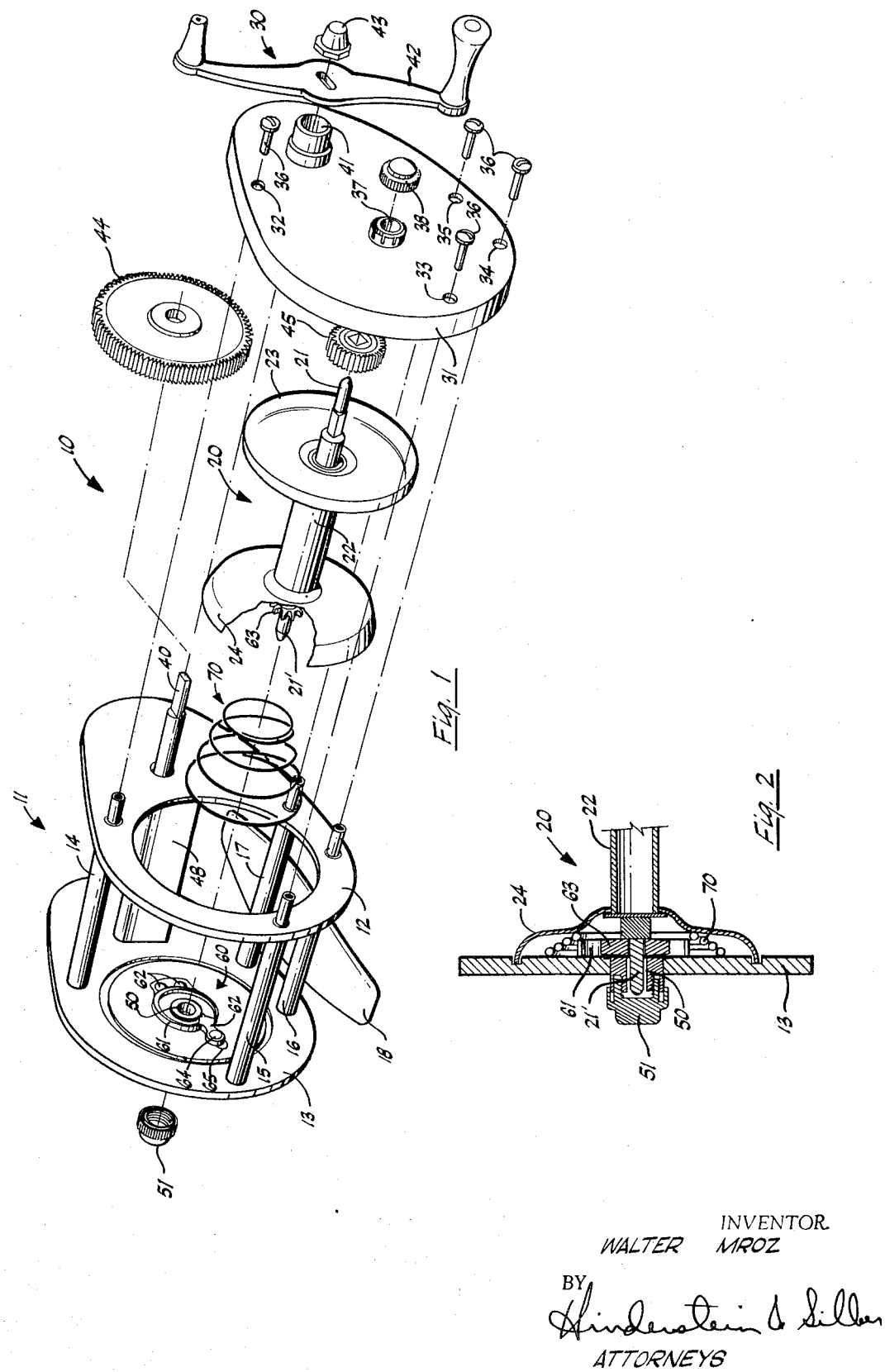

BACKLASH-PROOF FISHING REEL

BACKGROUND OF THE INVENTION

1. Field of the Invention

The present invention relates to a backlash-proof fishing reel and, more particularly, to apparatus which may be added to any standard type fishing reel to make such fishing reel virtually backlash-proof.

2. Description of the Prior Art

When fishing, either from a floating platform such as a boat or a land-based platform such as a pier or at the water's edge, it is common practice to cast one's line some distance from the platform. For this purpose, essentially all fishermen use a fishing rod and a reel, the latter being of two basic types. The first type of fishing reel, usually referred to as the standard type, includes a housing which rotatably supports a spool which consists of a shaft connected between first and second spaced, parallel end plates. The fishing reel is connected to the fishing rod with the axis of the spool perpendicular to the length of the rod and the line is withdrawn from the spool in a direction perpendicular to the axis of rotation thereof as the spool rotates.

Such standard type fishing reels have several desirable features and are, therefore, widely used. Such reels are basically simple, rugged, compact and inexpensive, making them a standard item in most fishermen's tackle box. On the other hand, such standard type fishing reels have one major disadvantage. More specifically, when casting with such a reel, the spool is released from the crank mechanism so that it is free to rotate when the line is cast out. This being the case, when the line hits the water, there is nothing to prevent the spool from continuing to rotate. If the spool continues to rotate when the line is no longer being withdrawn, the line accumulates around the spool, within the reel, resulting in tangling and knotting of the line. This tangling of the line, sometimes referred to as a "birds nest,", is the result of the phenomenon called "backlash."

Several methods have been devised to prevent backlash. The most common method is to "thumb" the spool. In other words, the fisherman places his thumb adjacent the spool when casting out and attempts to stop the rotation of the spool with his thumb as soon as the line hits the water. This procedure, while workable, is inconsistent at best. If the fisherman hits the spool before the line hits the water, there is a possibility of the line snapping. On the other hand, if the fisherman is late in applying his thumb to the spool, a birds nest may result. Furthermore, with large reels, of the type used in salt water fishing for large fish, there is a considerable amount of friction on the fisherman's thumb when using this method which may result in an uncomfortable bruise. To solve this particular problem, some fishermen use a "thumber," a leather finger attached to the reel which is pressed on the spool, under the control of the thumb. However, even though such thumbers may prevent bruising of the fisherman's thumb, they still do not solve the basic problem of stopping the spool too soon or too late.

Many attempts have been made to provide attachments for fishing reels which will prevent backlash and stop the spinning reel as soon as the line hits the water but none of such attachments have proven operable. By way of example, one fishing reel mounts a plurality of fins on the inner face of the housing plate and similar fins on the outer face of the spool plate. Such fins purportedly create wind resistance in the area between the housing and spool plates to prevent unlimited rotation of the spool. However, such fins have not proven successful. As a result, today, fishermen still use their thumbs to control the rotation of the spool or, alternatively, attempt to adjust the position of the end cap on the shaft of the spool to apply a sufficient amount of friction to the spool to prevent unlimited rotation thereof. However, this is a trial and error process and difficult, if not impossible, to adjust accurately.

The other type of reel commonly used for casting eliminates the backlash problem by positioning the axis of the spool parallel to the length of the fishing rod. By so positioning the spool, which now remains stationary, the line is pulled off of the end of the spool as it is cast out. A rotating finger is then provided for winding the line back onto the spool. An additional mechanism is also usually provided for oscillating the spool in a direction parallel to the axis thereof as the line is wound thereon to evenly distribute the line over the length of the spool.

While casting reels solve the basic backlash problem, they have several disadvantages associated therewith so that they are not as widely used as the standard type reel. More specifically, such reels are complicated, delicate and expensive. Because of their delicate nature, they are primarily used for fresh water fishing and are difficult to use for large fish such as found in salt water. In other words, because of the fact that the line is picked up by a rotating finger and wound over the spool, one cannot crank in the line when a fish is caught but must pump the pole up to gain line and then lower the pole, cranking at the same time, to wind the line on the spool. As a result, it takes substantially longer to bring in a fish with a casting reel than with a reel of the standard type. In addition, only light-weight line can be used because of the fragile construction of casting reels. Finally, such reels are awkward because they hang under the fishing rod and one must cast with one hand and then reel-in with the other hand in an opposite direction from normal.

SUMMARY OF THE INVENTION

According to the present invention, these problems of the prior art are entirely eliminated by providing apparatus for preventing backlash in fishing reels of the standard type. By making any standard type fishing reel virtually backlash-proof, the necessity for using the more delicate, complex and expensive casting reels is entirely eliminated. With the present apparatus added to any fishing reel of the standard type, the line may be cast out with no attempt made to control the rotation of the spool since as soon as the line contacts the water, the spool will automatically stop rotating, thereby preventing snapping or tangling of the line.

Briefly, the present invention comprises a spring consisting of a plurality of coils of wire, each successive coil having a smaller diameter than the preceding coil whereby the spring may be compressed to a length equal to the diameter of the wire. The spring is positioned in a fishing reel of the standard type, between the back plate of the housing and the adjacent end plate of the spool whereby the spring applies a slight to moderate pressure on the outer face of the spool plate to prevent unlimited rotation thereof.

It is therefore an object of the present invention to provide a backlash-proof fishing reel.

It is a further object of the present invention to provide apparatus for virtually backlash-proofing a fishing reel of the standard type.

It is a still further object of the present invention to provide a spring consisting of a plurality of coils of wire, each successive coil having a smaller diameter than the preceding coil, such spring adapted to be used with a standard type fishing reel to prevent backlash.

Still other objects, features and attendant advantages of the present invention will become apparent to those skilled in the art from a reading of the following detailed description of the preferred embodiment constructed in accordance therewith, taken in conjunction with the accompanying drawings wherein like numerals designate like parts in the several figures and wherein:

BRIEF DESCRIPTION OF THE DRAWINGS

FIG. 1 is a perspective, exploded view of a typical fishing reel of the standard type; and FIG. 2 is an enlarged, cross-sectional view of a portion of the fishing reel of FIG. 1, taken along the axis of rotation of the spool.

DESCRIPTION OF THE PREFERRED EMBODIMENT

Referring now to the drawings, there is shown one configuration of a fishing reel of the standard type, generally designated 10. Reel 10 includes a main housing 11 consisting of a front plate 12, a back plate 13 and a plurality of spacers 14 through 17 which maintain plates 12 and 13 in spaced, parallel relationship. A member 18 is secured to spacers 16 and 17, member 18 permitting attachment to a fishing reel.

Reel 10 also includes a spool, generally designated 20, consisting of a shaft or sleeve 22 connected between a pair of end plates 23 and 24 which are maintained in spaced, parallel relationship, the line being adapted to be wound around sleeve 22, between end plates 23 and 24.

The above-mentioned components are common to all standard type reels, although the shapes and sizes may vary somewhat. Different makes of reels are constructed and arranged in different ways although all such reels include a cranking mechanism, generally designated 30, for controlling the rotation of spool 20. By way of example, fishing reel 10 includes an additional plate 31 adapted to be secured to front plate 12 for housing the cranking mechanism 30. Plate 31 includes a plurality of holes 32–35 which are aligned with spacers 14–17. The ends of spacers 14–17 extend through holes 32–35 respectively, whereupon screws 36 extend into internally threaded holes in spacers 14–17 to secure plate 31 to plate 12. When so positioned, a shaft 21, connected to the end of sleeve 22, extends through an opening 37 in plate 31 which is closed by an end cap 38.

Fishing reel 10 may also include an additional shaft 40 which drives a feeder mechanism 48, which moves between plates 12 and 13 to evenly distribute the line on spool 20. The end of shaft 40 may extend through an opening 41 in plate 31 where it is connected to a handle 42 by a nut 43. A pair of gears 44 and 45 are positioned on shafts 40 and 21, respectively, the teeth of which engage when so positioned. In this manner, rotation of handle 42 rotates shaft 40 and gear 44, the latter rotating gear 45 and spool 20.

Opening 37 supports one end of spool 20 for rotation about an axis defined by sleeve 22 and shaft 21. The other end of spool 20 includes a shaft 21', connected to the other end of sleeve 22, shaft 21' extending through an opening 50 in back plate 13 which supports such other end of spool 20 for rotation. Opening 50 is enclosed by an end cap 51.

Essentially all standard type fishing reels include a ratchet mechanism, generally designated 60, which is designed to make an audible sound to indicate rotation of spool 20. In a typical case, ratchet mechanism 60 includes a ratchet spring 61 which is an annular member, one side of which is connected to back plate 13 by one or more rivets 62. The other side of ratchet spring 61 has a slit therein, through which extends a ratchet finger 62. Ratchet finger 62 is adapted to engage a ratchet gear 63 connected to shaft 21' adjacent the outside face of end plate 24. Accordingly, as spool 20 rotates, ratchet finger 62 oscillates under the control of ratchet gear 63 whereby ratchet spring 61 produces an audible sound. Ratchet finger 62 is connected to plate 13 by a rivet 64 which extends through a slot 65 whereby finger 62 may be slid radially to disengage ratchet gear 63, as during casting.

The spacing between plates 31 and 13 and end plates 23 and 24, respectively, is arranged to permit lateral movement of spool 20. More specifically, in order to permit free rotation of spool 20 when casting, there is a slight space between end plate 24 and back plate 13 and a similar space between end plate 23 and plate 31 to eliminate friction between such plates. In fact, it is this lack of friction which gives spool 20 unlimited rotational freedom and eventually causes backlash when casting. While friction may be added by tightening end caps 38 and/or 51, it is difficult, if not impossible, to adjust such friction to accurately stop spool 20 as soon as the line strikes the water.

According to the present invention, backlash in fishing reels of the standard type is virtually eliminated by the addition of a spring, generally designated 70. Spring 70 is of the "compression type" and consists of a length of wire formed into a plurality of coils. Each successive coil has an outside diameter which is equal to or smaller than the inside diameter of the preceding coil. In this manner, the coils may be compressed within each other so that the total length of spring 70 is as small as the diameter of the wire itself. This is necessary to permit spring 70 to be placed into the close confines of the space between the inner face of back plate 13 and the outer face of end plate 24, as shown in FIG. 2. In addition, the diameter of the large end of spring 70 must be great enough to avoid interference with ratchet mechanism 60 but small enough to avoid contact with the periphery of end plate 24. The diameter of the small end of spring 70 must be great enough to permit ratchet gear 63 to extend therethrough, also as shown in FIG. 2.

Spring 70 may be installed in any standard type fishing reel simply by taking the reel apart in the same manner as one would do in changing spools. After spool 20 is removed from the confines of housing 11, spring 70 is placed with the large diameter end on the inside face of back plate 13. Shaft 21' is then extended through the small diameter end of spring 70 and spool 20 is pushed until end plate 24 contacts back plate 13. While holding end plate 24 against back plate 13, the remainder of reel 10 is assembled in the conventional manner.

In operation, and with spring 70 in place, the small diameter end thereof exerts a slight to moderate pressure against the outer face of end plate 24 thereby eliminating the "play" in spool 20. By a proper design of the size of the wire and the number of turns in spring 70, this friction against plate 24 is minimal and only slightly affects the casting operation. However, when the line is cast out, the pressure exerted by spring 70 on plate 24 controls the rotation of spool 20 so that rotation is permitted only so long as the line exerts a counter force on the spool. When the line starts to decelerate, the pressure exerted by spring 70 causes spool 20 to decelerate by a corresponding amount so that the angular velocity of spool 20 corresponds to the velocity of the line. Finally, when the line strikes the water and is no longer being withdrawn from spool 20, spring 70 causes spool 20 to stop.

The size of the wire used in constructing spring 70, the number of coils therein, and the open length of the spiral is a function of several factors. In the first instance, as explained previously, the diameter of the small and large ends of spring 70 will be a function of the size of the fishing reel. Furthermore, the size of the wire, the number of coils and the length of the spiral will be a function of the weight of the spool since a large, heavy spool will have a greater inertia than a small, light spool, thereby requiring a greater force to control its rotation. More specifically, in the case of small, light, plastic spools, a wire diameter of 0.020 inches may be appropriate whereas with large, heavy metal spools, a wire diameter of 0.055 inches is more appropriate. In the case of small diameter wire, six or seven coils may be required to provide a suitable force, whereas in the case of large diameter wire, three coils may be sufficient. Other fishing reels, between these extremes, may use a wire size and number of coils of corresponding values. However, even though the size of the wire and the number of turns thereof may vary from one type of fishing reel to another, the principle of operation remains the same in all reels.

With spring 70 added to any fishing reel of the standard type, the line may be cast out with no attempt made to control the rotation of the spool, since the spool angular velocity will closely follow the linear velocity of the line, accelerating and decelerating as the line is cast out. As soon as the line contacts the water, the spool will automatically stop rotating virtually eliminating the possibility of a backlash or birds nesting of the line. By making any standard type fishing reel virtually backlash-proof, the necessity for using the more delicate, complex and expensive casting reels is entirely eliminated.

While the invention has been described with respect to the preferred physical embodiment constructed in accordance therewith, it will be apparent to those skilled in the art that various modifications and improvements may be made without departing from the scope and spirit of the invention. Accordingly, it is to be understood that the invention is not to be limited by the specific illustrative embodiment, but only by the scope of the appended claims.

I claim:

1. In a fishing reel of the type comprising a housing having spaced, parallel front and back plates, and a spool having a shaft connected between first and second spaced, parallel end plates, said spool being positioned within said housing with said first and second end plates adjacent and parallel to said front and back plates, respectively, said shaft being journaled in said front and back plates to permit rotation of said spool, said front plate including a crank mechanism for rotating said spool, and including a ratchet mechanism mounted on said back plate and a ratchet gear connected to said shaft, the improvement comprising:

a spring consisting of a plurality of coils of wire, each successive coil having a smaller diameter than the preceding coil, said spring being positioned in said fishing reel with the large diameter end thereof in contact with said back plate of said housing and with the small diameter end thereof in contact with said second end plate of said spool, said spring being compressed and applying a force to said spool to prevent unlimited rotation thereof, said force retaining said spring in position, the diameter of said large diameter and of said spring being large enough to avoid interference with said ratchet mechanism and small enough to avoid contact with the periphery of said second end plate, the diameter of said small diameter end of said spring being larger than the diameter of said ratchet gear.

2. In a fishing reel according to claim 1, the improvement wherein said diameter of said wire is in the range of from 0.020 inches to 0.055 inches.

3. In a fishing reel according to claim 2, the improvement wherein the number of coils of said spring is in the range of from three to seven.

4. In a fishing reel according to claim 1, the improvement wherein the outer diameter of each successive coil is smaller than the inner diameter of the preceding coil.

* * * * *